United States Patent
Gueguen et al.

(10) Patent No.: US 8,097,831 B2
(45) Date of Patent: Jan. 17, 2012

(54) USE OF AN ACTIVATING FLUX FOR THE TIG WELDING OF METAL PARTS

(75) Inventors: Mathieu Gueguen, Paris (FR); John Moreau, Ablon sur Seine (FR); David Daniel Soullier, Dammarie les Lys (FR)

(73) Assignee: SNECMA, Paris (FR)

( * ) Notice: Subject to any disclaimer, the term of this patent is extended or adjusted under 35 U.S.C. 154(b) by 763 days.

(21) Appl. No.: 12/204,388

(22) Filed: Sep. 4, 2008

(65) Prior Publication Data

US 2009/0065490 A1    Mar. 12, 2009

(30) Foreign Application Priority Data

Sep. 10, 2007 (FR) ...................................... 07 06332

(51) Int. Cl.
*B23K 9/02* (2006.01)
*B23K 9/032* (2006.01)
*B23K 9/23* (2006.01)
*B23K 9/235* (2006.01)

(52) U.S. Cl. .................. 219/137 R; 219/125.1; 219/162
(58) Field of Classification Search ........................ None
See application file for complete search history.

(56) References Cited

U.S. PATENT DOCUMENTS

| | | | | | |
|---|---|---|---|---|---|
| 2,468,371 | A | * | 4/1949 | Landis et al. | 219/137 R |
| 3,493,713 | A | * | 2/1970 | Johnson | 219/73.21 |
| 3,588,443 | A | * | 6/1971 | Johnson | 219/137 R |
| 3,610,876 | A | * | 10/1971 | Bhat | 219/137 R |
| 4,153,832 | A | * | 5/1979 | Iio et al. | 219/124.34 |
| 4,754,118 | A | * | 6/1988 | Fukaya et al. | 219/137 R |
| 5,430,269 | A | * | 7/1995 | Natsume et al. | 219/73 |

FOREIGN PATENT DOCUMENTS

| | | |
|---|---|---|
| EP | 1 419 842 A2 | 5/2004 |
| EP | 1 584 402 A2 | 10/2005 |

\* cited by examiner

*Primary Examiner* — Joseph M Pelham
(74) *Attorney, Agent, or Firm* — Oblon, Spivak, McClelland, Maier & Neustadt, L.L.P.

(57) ABSTRACT

A method for welding two metal parts, in which:
the metal parts are positioned against each other in a welding position, the parts being respectively in surface contact along their welding surfaces, at least one of the parts having at least one extra-thick zone along its welding surface;
TIG welding is carried out on the welding surfaces (v) of the metal parts by means of a TIG welding torch, a method in which
a penetrating welding flux is applied locally on said extra-thick zone of the metal part prior to the TIG welding step.

6 Claims, 4 Drawing Sheets

USE OF AN ACTIVATING FLUX FOR THE TIG WELDING OF METAL PARTS

BACKGROUND OF THE INVENTION

The invention concerns the welding of metal parts, in particular in the aeronautic field, and more particularly in that of gas turbine engines.

Welding of the TIG (Tungsten Inert Gas) type makes it possible to weld metal parts by means of an electric arc. TIG welding is an arc welding method with a non-fusible electrode.

Referring to FIG. 1, an electric arc 61 is created between a welding torch 60, of which the potential is negative, and a first metal part 1, of which the potential is positive. The first part 1 is in contact with a second part 2 to which it is to be welded. The welding torch 60 is brought close to the first part 1, the potential difference creating an electric arc 61. The energy provided by the arc raises the temperature of the parts 1,2 bringing about their local fusion and their welding as they cool. However, when the parts are very thick, penetration of heat may not be sufficient, preventing effective welding.

When the thickness is not constant, welding brings about a variation in the quality of the weld, it being possible for welding to be of a good quality overall on thin zones and, conversely poor quality on thick zones.

It is possible to increase the power of the arc in order to improve welding of thick zones. However, passing a welding torch, parameterized with a high power over a thin zone, may deform the part and cause too great a penetration of heat in said part. The part thus deformed cannot be repaired and thus must be rejected.

DESCRIPTION OF THE PRIOR ART

In order to weld parts, of which the thickness is not constant, it is possible to machine a chamfer beforehand on the thick zones so that the part has a reduced and constant thickness along the welding zone. Once the parts are welded by applying the welding arc, material is provided on the welded parts so as to build up the material removed during chamfering. This step, called filling, enables the welded parts to recover their original form before chamfering.

This technique is currently employed for welding the thick arms of the intermediate casing of a turbojet, however, the preparation step for welding this type of metal parts requires considerable and lengthy work. In addition, owing to thermal stresses, parts are likely to deform during the filling operation. Employing this type of welding is therefore very cumbersome and not well suited to production on an industrial scale.

It is known, in order to improve the penetration of welding heat into the part and thus to enable thick parts to be welded, an activating arc welding method is used, called ATIG (Active Tungsten Inert Gas) consisting of depositing a penetrating or activating welding flux before application of the arc onto the part to be welded, the flux being composed mainly of chlorides and fluorides. This flux has a direct influence over the width of the electric arc by constriction. For the same applied energy, it thus makes it possible to increase the surface energy and to improve penetration of heat into the parts.

Such a penetrating flux is well known to a person skilled in the art under trade names such as Eli Titanium. Conventionally, the thick part to be welded is coated with flux over all its length, prior to passing the welding torch.

However, given the high manufacturing costs of aeronautic parts, ATIG welding is, to the knowledge of the Applicant, not used to any great extent in the field due to the risks that it involves.

SUMMARY OF THE INVENTION

The Applicant has, as his objective, improvement of the technique for welding metal parts.

He proposes a method for welding two metal parts, in which:
the metal parts are positioned against each other in a welding position, the parts being respectively in surface contact along their welding surfaces, at least one of the parts having at least one extra-thick zone along its welding surface;
TIG welding is carried out on the welding surfaces of the metal parts by means of a TIG welding torch.

This method is characterized in that a penetrating welding flux is applied locally onto said extra-thick zone of the metal part, prior to the TIG welding step.

The penetrating welding flux has the function of locally concentrating the TIG welding arc in the only extra-thick zone, heat penetrating in depth into the metal part.

By virtue of the invention, it is not necessary to chamfer the part beforehand, which means a gain in time.

The other zones are welded in a conventional manner with a suitable energy input without risk of deforming the part.

The weld produced is thus homogeneous and independent of thickness variations.

Preferably, the TIG welding torch operates at a constant power during the TIG welding step.

Since the welding power or intensity is independent of the thickness of the part, the method of the invention makes it possible to accelerate the TIG welding step.

Preferably, a mask is applied to the metal part, arranged so as to allow the penetrating welding flux to be deposited in a precise manner over the extra-thick zone of the metal part.

The mask makes it possible to repeat the operation in series over many parts while preserving the same welding quality.

According to one embodiment of the method, the TIG welding torch is moved at a first speed along the coated zone and at a second speed over zones lacking penetrating welding flux, the first and second speeds being constant.

Inasmuch as a transition zone is provided between the coated zone and an adjacent zone lacking penetrating welding flux, the TIG welding torch is moved at a speed different from said first and second speeds over the transition zone.

Where appropriate, a mechanical scouring step is carried out after the parts have been welded, scouring enabling any residual trace of penetrating welding flux to be removed.

DESCRIPTION OF THE DRAWINGS

Other features and advantages will become apparent from the following description of the method of the invention with reference to the figures in which:

The invention concerns in particular welding of the radial arms in an intermediate casing of a double-flow gas turbine engine. FIG. 2 shows an intermediate casing with an outer collar 111, an interstream casing element 130—namely the casing element between the primary flow stream and the secondary flow stream—and a hub 120 made of a titanium-based alloy. Radial connecting arms 100 connect these various casing elements together. In manufacture, assembly of this complex part comprises welding the radial arms 100 to the casing elements 120 and 111.

The invention will be described with reference more particularly to welding between the inner end 101 of a connecting arm 100 and an element 111 secured to the inner collar 120.

DESCRIPTION OF THE PREFERRED EMBODIMENTS

Figure 1:
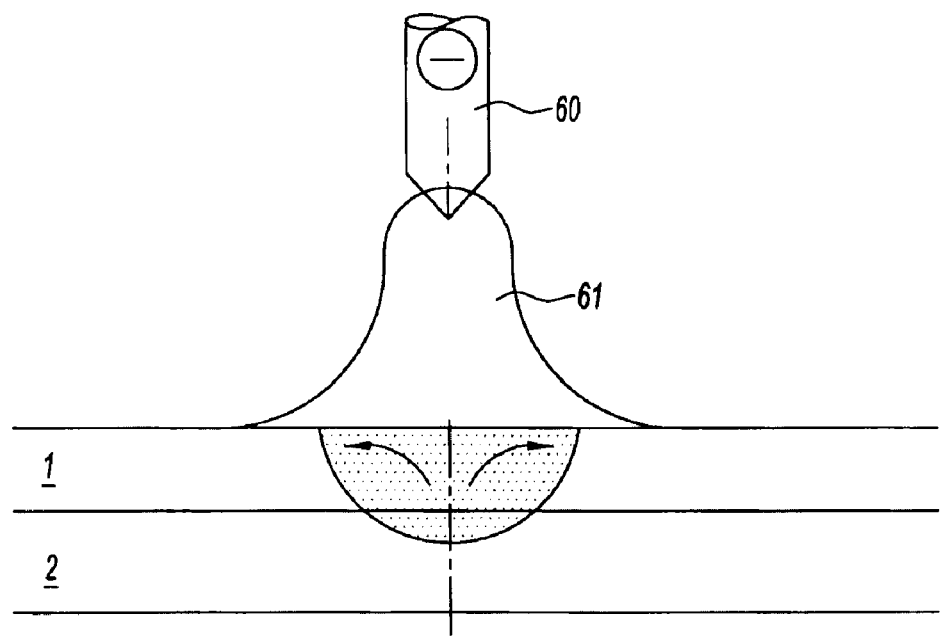
FIG. 1 shows TIG arc welding according to a method of the prior art.
Figure 2:
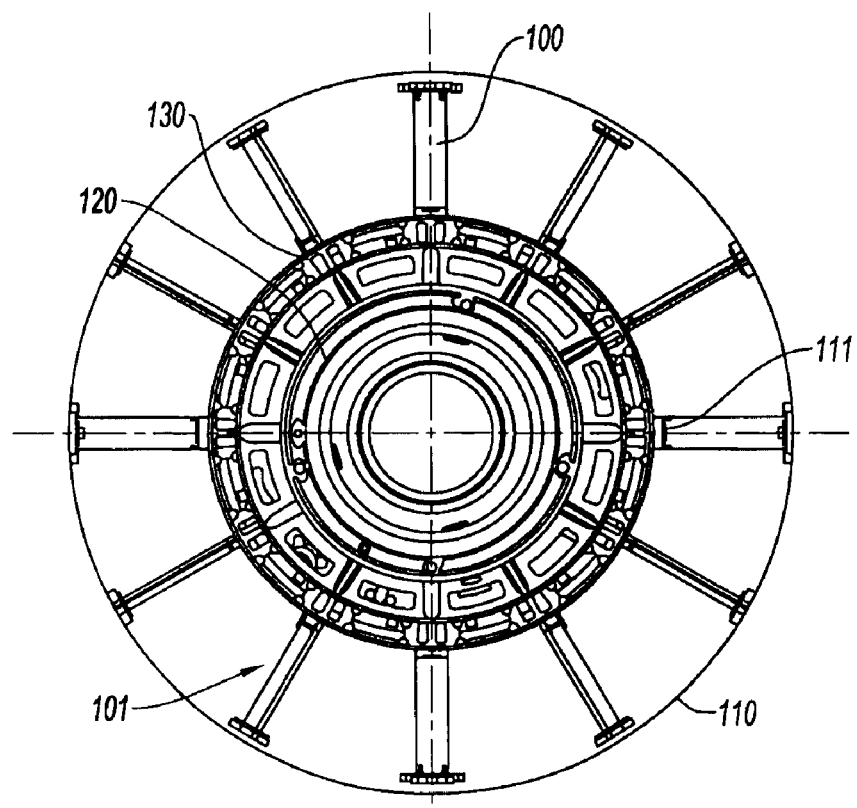
FIG. 2 shows a rear view of an intermediate casing of a turbine engine.
Figure 3:
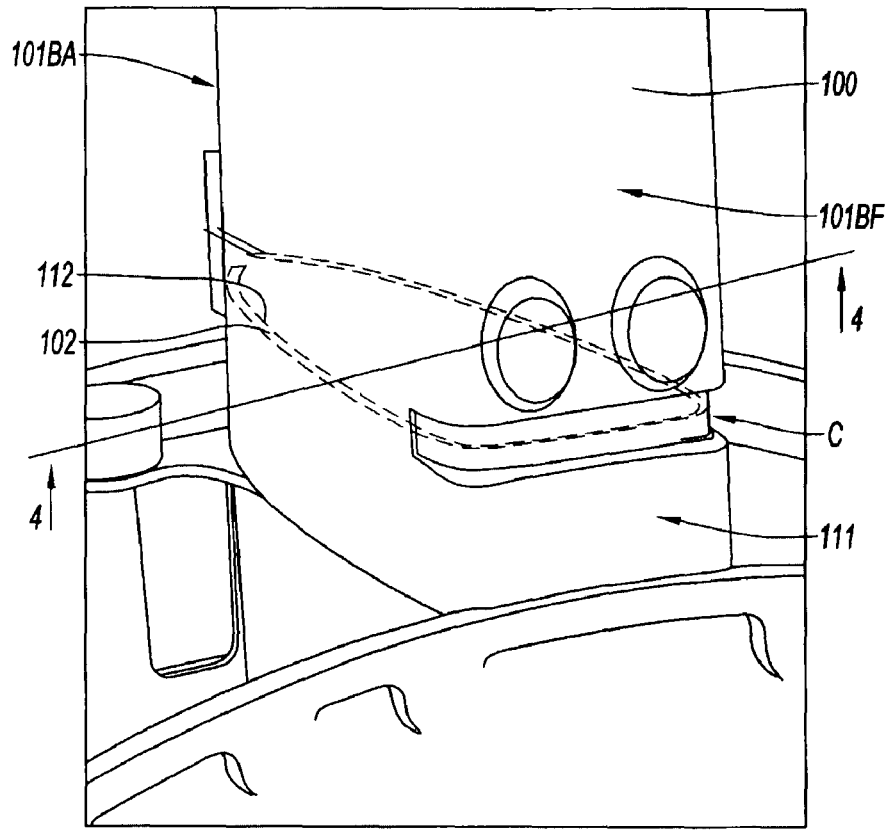
FIG. 3 shows a perspective view of part of a radial arm of the intermediate casing of the turbine engine of FIG. 2 prepared for welding according to the prior art.
Figure 4:
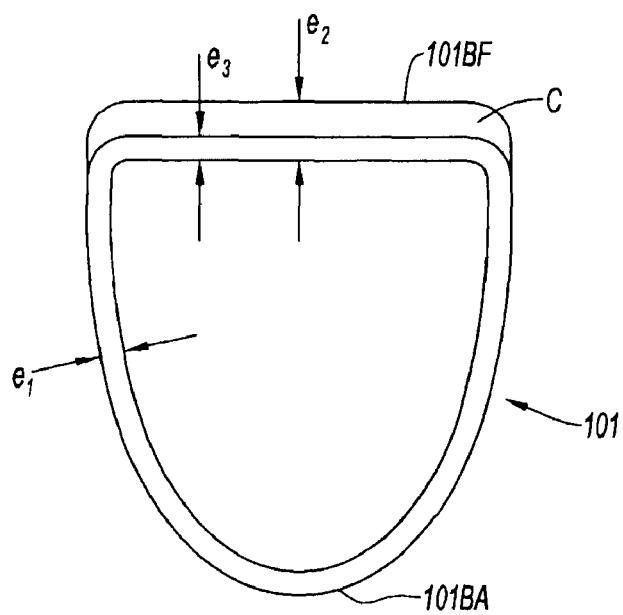
FIG. 4 shows the arm of FIG. 3 in section along the direction 4-4.

With reference to FIGS. 3 and 4, the radial connecting arm 100 is in the form of a part that is elongated and hollow in the radial direction, with an aerodynamic profile having a rounded leading edge 101BA and a flat back 101BF perpendicular to the direction of flow of the downstream air. The thickness of the arm 100 is not constant along its periphery and its thickness changes between 2.5 mm and 7 mm. The thickness e1 is smaller laterally and is at a maximum e2 at the back 101BF. The transverse surface at the radial end 101 of the arm 100 is designated the welding section 102. The connecting arm 100 is in a welding position with the element 111 secured to the outer collar 120 and which extends radially, the welding section 102 of the connecting arm 100 resting on the welding surface 112 defined on the element 111.

Application of the prior art will be seen in this FIG. 3 or 4. It consists of machining a chamfer C in the wall of the back 101BF so that the thickness e3 to be welded is reduced at this location. e3 is substantially equal to e1. This technique enables a good quality weld to be obtained since the conditions remain the same all along the weld. The machined zone should be built up after welding in order to reconstitute the aerodynamic profile. It will however be understood that the operation is long overall and difficult.

Figure 5:
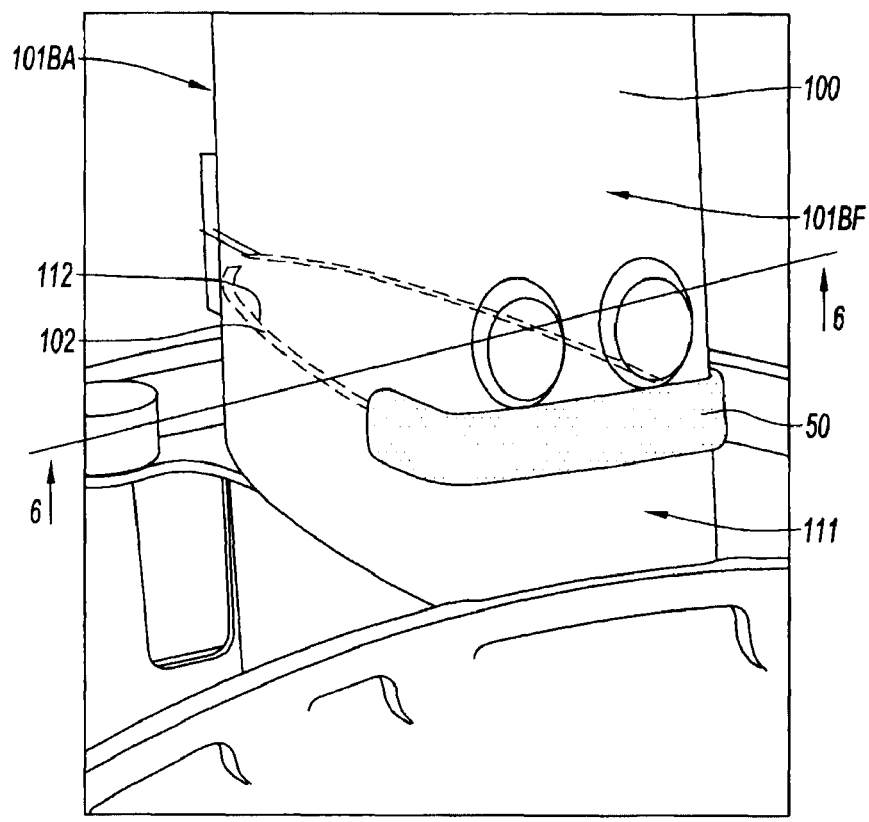
FIG. 5 shows a perspective view of the radial arm prepared for welding according to the invention, the arm being covered with a penetrating welding flux on its extra-thick part.
Figure 6:
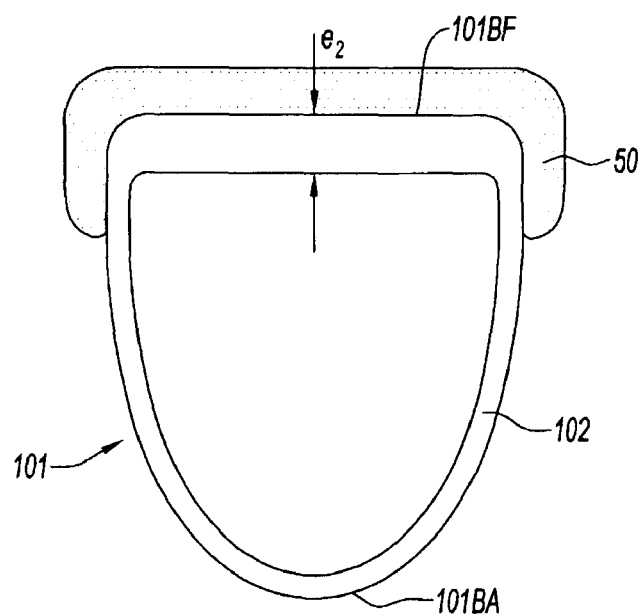
FIG. 6 shows the arm of FIG. 5 in section along the direction 6-6.

In FIGS. 5 and 6, the same parts have been shown but were prepared according to the invention. Instead of machining, a penetrating welding flux was applied to the thick zone of the arm, which corresponds substantially to the zone that was machined in the prior art. This zone extends over the width of the back 101BF projecting over the lateral walls. The penetrating welding flux forms a bead 50.

For putting the flux in place, the arm is put in position on the element 111 and the outer surface is covered with a mask in the thin part.

A penetrating welding flux 50 is then applied by means of an aerosol or brush to the outer surface straddling the connecting arm 100 and the element 111.

This penetrating welding flux 50 is well known to a person skilled in the art under its trade name such as Eli Titanium.

Once the arm 100 has been coated with flux 50, the mask is removed.

Figure 7:
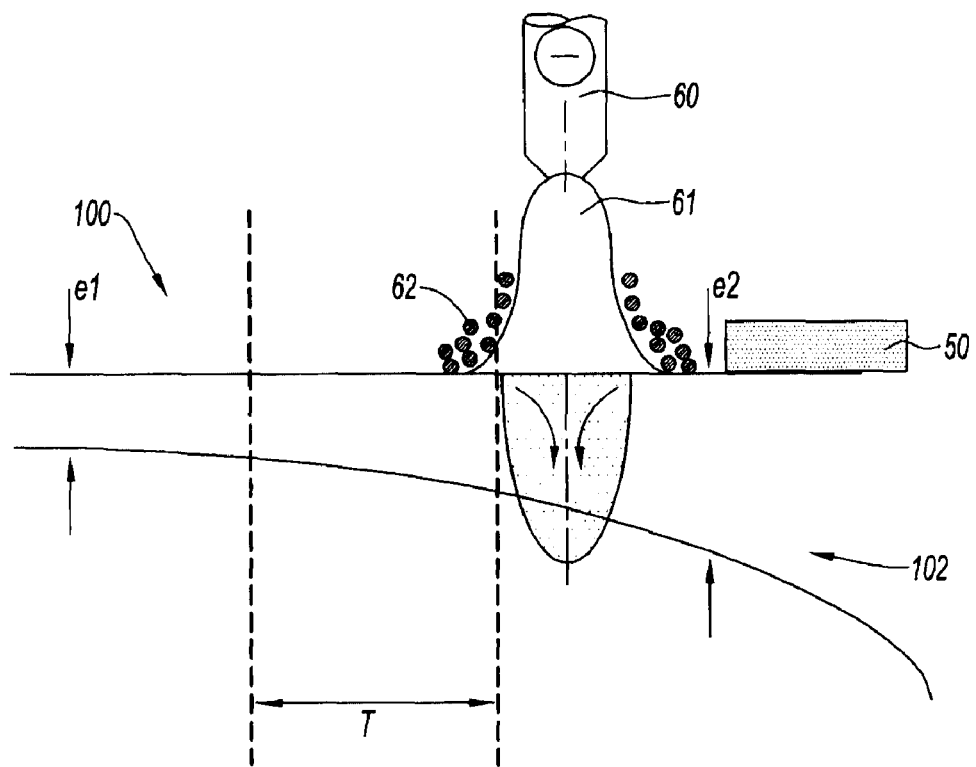
FIG. 7 shows welding of the arm of FIG. 5 by means of welding torch according to the method of the invention.

With reference to FIG. 7, a TIG welding torch 60 is brought close to the zone to be welded, that is to say the interface between the arm 100 and the element 111. An electric arc 61 is created between the welding torch 60 and the outer surface of the assembly.

When the electric arc 61 is formed between the welding torch 60 and the thin portion of the connecting arm lacking penetrating welding flux 50, the heat generated by the arc 61 is propagated over a few millimeters. The power is adapted so as to limit deformation.

When the electric arc 61 is formed between the welding torch 60 and the thick portion of the connecting arm 100 covered with penetrating welding flux 50, the heat generated by the arc 61 is propagated in depth under the action of the penetrating flux 50 and its particles 62 as shown in FIG. 7. The weldable thickness is increased compared with a thin portion lacking penetrating welding flux 50.

The concentration of heat compensates for the local increase in thickness, guaranteeing a homogeneous weld of the connecting arm 100 on the collar element. A homogeneous weld limits the risk of the assembly breaking in the region of the weld join.

The torch 60 is passed continuously over the arm. The TIG welding torch is moved at a first speed over the coated zones and at a second speed over the zones lacking penetrating welding flux, the first and second speeds being constant.

The speed of movement of the welding torch 60 is parameterized so that it is reduced when the electric arc 61 approaches a transition (T) between a thick portion and a thin portion of the welding section, so as to increase the surface energy locally in the transition zone (T) as shown in FIG. 7.

The torch 60 is controlled in an automated manner which reduces the welding time and facilitates reproducibility of welding over each of the connecting arms 100.

When the TIG welding step has finished, a finishing step is carried out enabling the part to be smoothed by filling in hollows that may appear in places. Such a finishing step does not require previous cleaning of the parts 100, 111. Residual flux 50, burned or not during the welding step, is removed by mechanical scouring.

The invention claimed is:

1. A method for welding two metal parts each having a predetermined thickness, in which:
   the metal parts are positioned against each other in a welding position, the parts being respectively in surface contact along their welding surfaces, at least one of the parts having at least one extra-thick zone along its welding surface which is substantially thicker than at least one other zone along its welding surface;
   TIG welding is carried out on the welding surfaces (v) of the metal parts by means of a TIG welding torch, a method in which
   a penetrating welding flux is applied only on said extra-thick zone of the metal part prior to the TIG welding step.

2. The method as claimed in claim 1, in which the TIG welding torch operates at a constant power during the TIG welding step.

3. The method as claimed in claim 1, in which a mask is applied to the metal part, arranged so as to allow the penetrating welding flux to be deposited in a precise manner over the extra-thick zone of the metal part.

4. The method as claimed in claim 1, in which the TIG welding torch is moved at a first speed along the coated zone and at a second speed over zones lacking penetrating welding flux, the first and second speeds being constant.

5. The method as claimed in claim 4, in which the TIG welding torch is moved at a speed different from said first and second speeds over a transition zone between the coated zone and an adjacent zone lacking the penetrating welding flux.

6. The method as claimed in claim 1, in which a mechanical scouring step is carried out on the welded parts, scouring enabling any residual trace of penetrating welding flux to be removed.

* * * * *